United States Patent [19]

Varga

[11] Patent Number: 4,959,578

[45] Date of Patent: Sep. 25, 1990

[54] DUAL ROTOR AXIAL AIR GAP INDUCTION MOTOR

[75] Inventor: Joseph S. Varga, Little Rock, Ark.

[73] Assignee: Axial Electric, Inc., Sherwood, Ark.

[21] Appl. No.: 125,615

[22] Filed: Nov. 24, 1987

[51] Int. Cl.$^5$ ................... H02K 1/22; H02K 23/44
[52] U.S. Cl. ................... 310/268; 310/114; 310/191; 310/209
[58] Field of Search ............. 310/166, 190, 191, 268, 310/112, 83, 114, 207, 209, 114

[56] References Cited

U.S. PATENT DOCUMENTS

| | | | |
|---|---|---|---|
| 2,573,283 | 10/1951 | Seitz | 310/268 |
| 2,824,275 | 2/1958 | Kober | 322/27 |
| 3,242,365 | 3/1966 | Kober | 310/191 |
| 4,110,649 | 8/1978 | Mas | 310/191 |
| 4,319,152 | 3/1982 | van Gils | 310/207 |

Primary Examiner—Steven L. Stephan
Assistant Examiner—D. L. Rebsch
Attorney, Agent, or Firm—Axial Electric, Inc.

[57] ABSTRACT

The first preferred embodiment of the subject invention is a dual rotor axial induction machine which utilizes a polyphase central stator consisting of a number of mutually isolated core segments. The primary windings of the stator induce electromotive forces in the secondary winding of both end rotors that are revolving beside the adjacent axial face of the stator. One end rotor assembly is firmly mounted on a common shaft whereas the other end rotor can be shifted around the common shaft. Through physical positioning of the moveable rotor, phase shifting of both star connected and mutually interconnected rotor windings is achieved.

The second embodiment is a cage-type axial induction machine with a central stator which utilizes the protruding portion of a shaft of a driven machine. A pair of cage-type end rotors are mounted on the shaft whereas the central stator assembly is mounted to the housing of the driven machines.

7 Claims, 9 Drawing Sheets

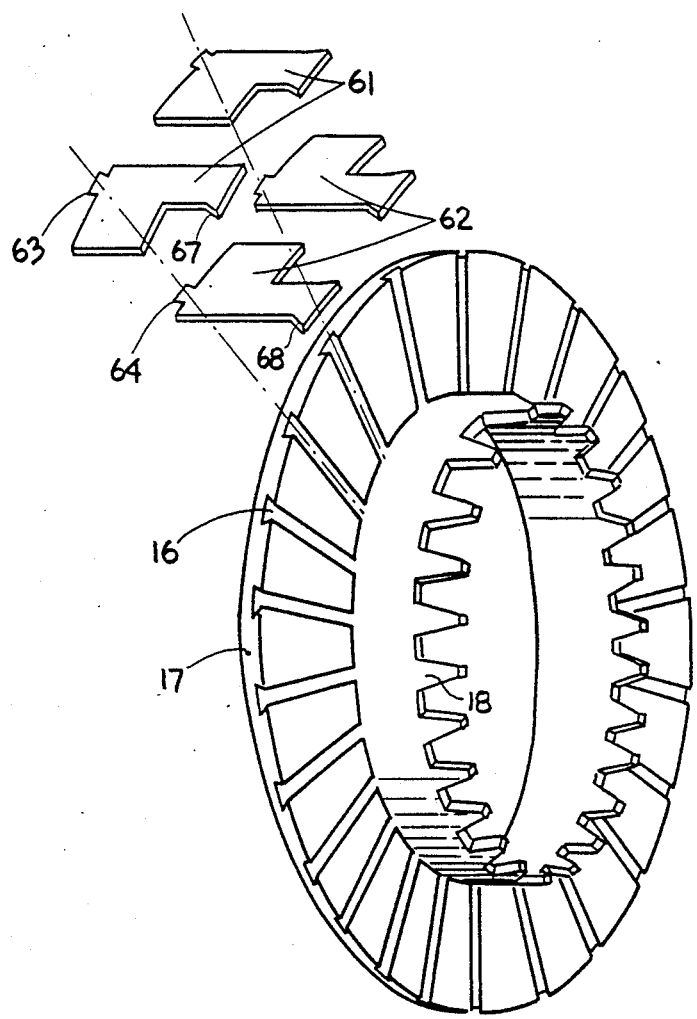
FIG. 2a
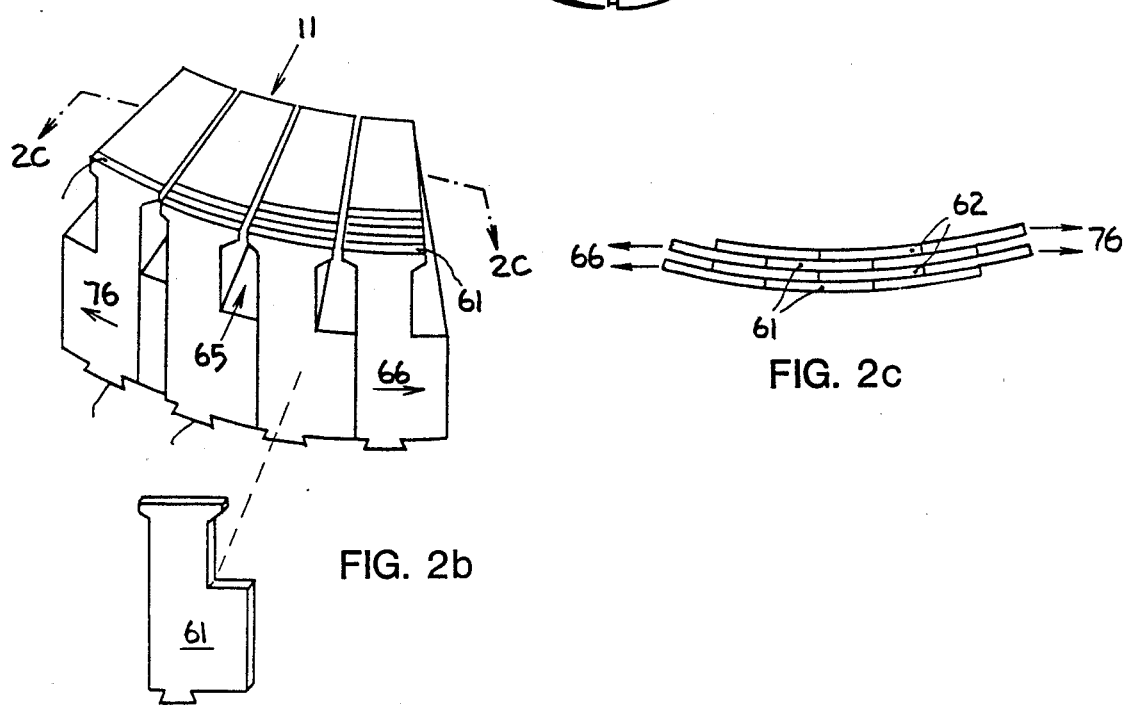
FIG. 2c
FIG. 2b $\Theta_R = 0;$
$\bar{E}_R = \bar{E}_{R1} - \bar{E}_{R2} = 0$ $\Theta_R = 180°\text{EL};\quad \phi_R = \phi_{R\,max}$
$\bar{E}_R = \bar{E}_{R1} + \bar{E}_{R2}$

DUAL ROTOR AXIAL AIR GAP INDUCTION MOTOR

FIELD OF THE INVENTION

This invention relates in general to rotating machinery, and in particular to a novel polyphase axial air gap type induction machine employing a central stator.

BACKGROUND OF THE INVENTION

Dynamoelectric devices such as motors and generators are often classified according to the orientation of the lines of flux between the stationary and rotating elements. Thus, electrical generators and motors are referred to as radial or axial field (axial air gap) devices. Although radial field devices are in widespread use, axial field devices have not found wide acceptance.

Dynamoelectric machines of the axial air gap type generally have a plurality of wedge-shaped core segments arranged in a circular array. The core segments have their wider ends adjacent the outer periphery of the circular array, and their narrower ends adjacent the axial center of the array. Supports for the array may include a winding radially extending between the wedge-shaped core segments and enclosure adjacent the outer periphery of the array.

In recent years, some advantages of the axial air gap-type motor have been recognized. The machine length in the axial direction is shorter, and the rotor is of a disk-type, therefore the total weight of the motor is considerably less than that of radial air gap type machine.

Prior art designs for axial field (axial air gap) motors or the like as exemplified by U.S. Pat. No. 2,469,808 (Aske), were generally of a pancake design and offered low volumetric efficiency. Core losses which include eddy current and hysteresis losses were substantial and greatly contributed to the overall inefficiency of the motor design. The core of the motor is composed of a flat annular ring formed from a tight, spirally wound strip of electrical steel lamination. Axial field machines with flat disk design features offered low volumetric efficiency and therefore, high losses. Examples of axial field motors employing multiple rotor or stator designs were also set forth in U.S. Pat. Nos. 2,557,249 (Aske) and 2,550,571 (Littman).

U.S. Pat. No. 2,734,140 (Parker) discloses a motor utilizing spacing threaded rods for the stator core blocks. Such an arrangement is difficult to manufacture. U.S. Pat. No. 3,567,973 (Parker) employs central stators inside end rotors. This solution introduces a cooling problem due to the unchanged design of the stator assembly, specifically when imbedded inside a plastic medium.

U.S. Pat. No. 3,699,372 (Abe) includes rotor segments wedged into a disk face of a secondary conductor, specifically applied for a central rotor cage. A similar design feature is shown in U.S. Pat. No. 2,550,571 (Littman). U.S. Pat. No. 2,245,577 (Dickman) shows a central stator arrangement of a cage-type axial induction motor, where the stator segments are composed of soft iron cores and have stator windings on their outer ends projecting outward from the non-magnetic plate. U.S. Pat. Nos. 4,370,582 (Addicot) and 4,410,820 (Stanley) have repeatedly introduced the annular rotor core of the cage-type axial induction machine.

U.S. Pat. No. 3,275,863 (Fodor) employs a design for stator/rotor segments using powdered metal technology. U.S. Pat. No. 3,469,134 (Beyersdorf) introduces two structurally separate disk portions for either the stator or rotor construction of the axial air gap type machine with a central rotor arrangement. Such a machine has split core segments and multiple air gaps which reduce the core's active cross sectional area and decrease the output power of the machine. It is also too complicated to assemble.

The earliest central rotor configuration of the axial induction machine is found in U.S. Pat. No. 1,605,796 (Tanzler), in which a doubled rotor core inside end stators have a separate magnetic loop. U.S. Pat. No. 1,829,686 (Swendsen) employs either end stator or end rotor configuration. Pat. Nos. 2,573,283 (Seitz) and 2,824,275 (Kober) utilized two-unit feature.

U.S. Pat. No. 4,371,801 (Richter) deals with a multi-stator axial air gap alternator having output power or power factor control ability, by controlling the degree of phase misalignment of two stator assemblies. A detailed description of the axial air gap rotor/stator core elements and their geometric properties is found in U.S. Pat. No. 4,394,597 (Mas). U.S. Pat. No. 4,500,806 (Kanayama) reveals an arrangement of printed flat coils inside a thin and coreless central stator annular base of insulating material. U.S. Pat. No. 3,575,624 (Keogh) uses a wire wound disk armature wave form closed winding connected to commutator segments.

There is thus a need for an improved polyphase axial air gap type induction machine with speed control feature that exhibits increased output power, improved torque capability, reduced noise and vibration, and is simple to manufacture. The invention presented was developed to achieve these goals.

SUMMARY OF THE INVENTION

The first preferred embodiment of the invention relates to an axial air gap type dual wound rotor induction machine which utilizes a polyphase central stator consisting of a number of mutually isolated stator core segments. The primary winding of the stator induces electromotive forces in the secondary windings of both end rotors. The rotors are revolving beside the adjacent axial faces of the stator. One end rotor is mounted on a common rotor shaft so the other end rotor can be shifted around this shaft. Through physical positioning of the moveable rotor, phase shifting of both star connected and mutually interconnected rotor windings, individually laid in the slots of both end rotors, is achieved.

The stator core segments of the central stator assembly may be kept in position either inside a non-magnetic stator plate, or by a self-contained winding wound from a band conductor. The primary winding consists of ready-made coils, shaped either in a lemniscate plane geometric form (four pole machines), or in a n-leaved roses plane geometric form (for machines with p=2n poles, where n is greater than or equal to 2).

Both end rotor assemblies comprise magnetic rotor core lamination elements, arranged in subsequently opposite order of the coat layers of an annulus, to form rotor cores that are stacked on each of the rotor rear plates. In the radially disposed slots of each end rotor assembly is laid an open star connected lemniscate, or n-leaved roses open wave form wire-type polyphase secondary winding. The open ends of both secondary windings are moveable and interconnected through a bore, defined in the central stator assembly. By positioning the turnable end rotor assembly, a mutual phase shifting of induced electromotive forces in two rotor windings is achieved, resulting in motor speed change.

The second preferred embodiment of the invention relates to a novel axial air gap type induction machine with a central stator, which utilizes the protruding portion of a shaft of a driven machine. A pair of cage-type end rotors are mounted on a shaft, whereas the central stator assembly is mounted to the housing of the driven machine. An advantageous feature of this construction is the elimination of a shaft and end shields, found in a normal axial air gap type induction motor. In this embodiment, the polyphase axial air gap type induction machine becomes an integral part of the driven machine.

It is a primary objective of the present invention to provide an improved axial air gap type induction machine. It is another objective of the present invention to provide an axial induction machine having a simple internal speed control through magnetic field variation.

BRIEF DESCRIPTION OF THE DRAWINGS

FIGS. 2, 5 and 7 provide assembling sequence for FIG. 1.

FIG. 2a shows the arrangement for the rotor core elements of the embodiment of FIG. 1, and FIG. 2b a portion of stacked core elements. FIG. 2c is a view along lines 2c—2c of FIG. 2b, to show an alternating orientation of the rotor core elements.

FIG. 5b is a view along lines 5b—5b of FIG. 5a.

FIG. 7 is a perspective view showing a relationship between the coils of the primary winding and stator core segments of FIG. 1.

DETAILED DESCRIPTION OF THE PREFERRED EMBODIMENTS

FIGS. 1 through 9 generally illustrate the first embodiment of the invention in the form of a polyphase axial air gap induction machine, or motor with a dual wound rotor and a central stator.

Figure 1:
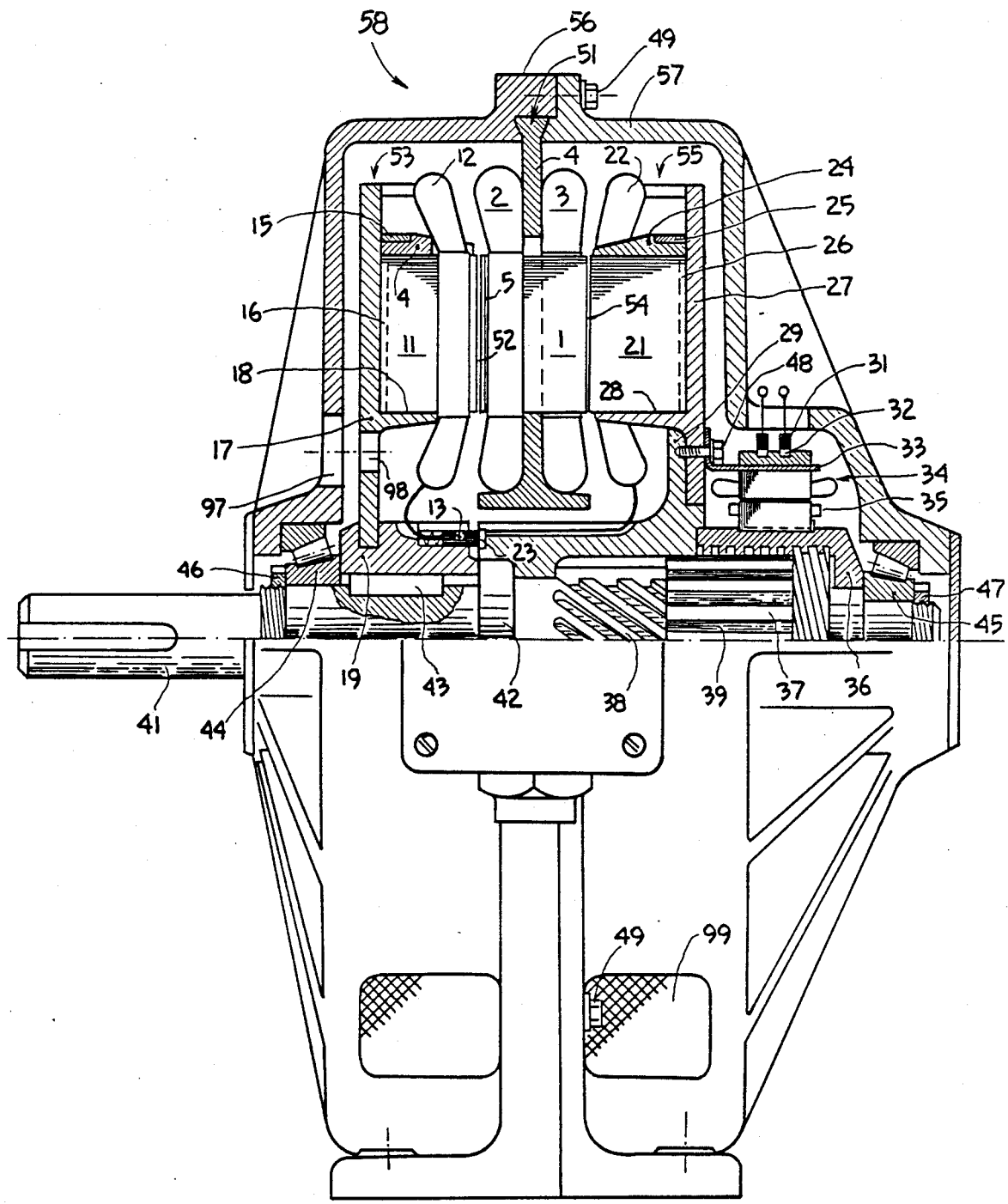
FIG. 1 is a side view of the first embodiment, revealing the interior of the motor.

FIG. 1 is a cross-sectional view of the first embodiment.

The motor includes a cylindrically-shaped rotor shaft 41 positioned within the housing 58. Two end shields 56 and 57 are connected using screws 49, to form the housing 58.

The shaft 41 is mounted to counter longitudinal movement within the housing using tapered roller bearings 44 and 45. The round end nut 46 secures the left end rotor assembly 53. Associated with the shaft 41 are rotor hubs 19 and 29. The skewed groove slider 37 mates with the threaded cylinder 36, and the nut 47 secures the structure to the threaded portion of the shaft 41. Centrally located within housing 58 is a stationary non-magnetic stator plate 4, with radially disposed stator core segments 1 and primary windings 2 and 3.

The central stator assembly 51 forms the left or forward axial face 52, and the right or rear axial face 54. Adjacent to face 52 is the left end rotor assembly 53. This assembly comprises a rotor rear plate 17 having an outwardly extending and cylindrically shaped platform 18, on which rests the rotor core 11.

The similar structure is on the right side of the motor for the right end rotor assembly 55. However, instead of the rotor assembly being permanently mounted to the shaft, the rotor rear plate 27 is turnable up to 180 electrical degrees around the axis.

The stator core segments 1 are kept in a position inside non-magnetic stator plate 4. The coils of the open wave form wire-type polyphase primary windings 2 and 3 are laid in slots besides stator core segments 1 and are locked in those slots by wedges 5. The left rotor core 11 is stacked from lamination elements 61 and 62, with a star connected open wave form wire-type polyphase secondary winding 12 inside of slots 65. The rotor core 11 lamination elements are compressed by the fingers 14, and secured by clamp 15. The left rotor core 11 is stacked in radial dovetail guides 16 on the duralumin rotor rear plate 17, which is pressed into the hub 19. The left end rotor assembly is pulled on the rotor shaft 41 and secured by key 43, while the bearing 44 cone secures its axial position.

The right rotor core 21 is identical to the described above left rotor core 11. Respective components are: core lamination elements 71 and 72, winding 22, fingers 24, and outer rotor clamp 25. The core 21 is stacked in radial dovetail guides 26 of the duralumin rotor rear plate 27, and rests on an outwardly extended, cylindrically shaped platform 28. The rotor rear plate 27 is mounted to the hub 29 by screws 48, and finally after installing the central stator assembly, the right-hand rotor assembly is pulled on the shaft 41.

Each of the rotor core elements 61, 62 or 71, 72 comprises a thin planar piece of lamination formed in an L-shape with the top of the L having transverse outwardly extending bosses 68. The base of the L contains a dovetail projection 63. As can be seen in FIGS. 2b and 2c, these rotor core elements are arranged to lie one on top of the other in a subsequently opposite order of coat layers (66) and (76).

The right end rotor assembly can be positioned around the axis in a range of 180 electrical degrees which, in a case of the four-pole machine, corresponds to 90 geometric degrees. This feature is utilized for phase shifting between the two rotor assemblies. Phase shifting is accomplished by the servomotor 34, powered through brushes 31 and slip rings 32, carried by stator housing 33 of the servomotor. The housing 33 is mounted to the right end rotor assembly by screws 48, while rotor 35 of the servomotor rotates together with threaded cylinder 36.

When the servomotor is energized, it axially moves the skewed groove slider 37 on the rotor shaft 41 with skewed grooves 38. The slider 37 has straight grooves 39 from outside, and skewed grooves from inside, thus matching similar grooves on the right end rotor assembly and on the shaft 41. The servomotor 34 is energized only when controlling a speed. The secondary windings of both side end rotors are interconnected through brushes 13 connected to open ends of the left secondary winding 12. Sliders 23 are connected to open ends of the right secondary winding 22.

The left end rotor assembly 53 and bearing 44 cone are firmly locked to shaft 41 by round nut 46. Similarly, the right end rotor assembly 55, cylinder 36, and bearing 45 are secured by end nut 47. The tapered roller bearings provide smooth rotation and axial tolerances.

FIG. 1 shows an enclosed-type cooling with natural convection and radiation. The air enters the enclosure via aperture 97, cooling windings 12 and 22, and flows around coil heads of the central stator assembly, and partly through rotor apertures 98 toward inner coil heads of the central stator assembly 51. Finally, the air flows through axial gaps, leaving the enclosure via peripherical apertures 99.

Figure 3B:
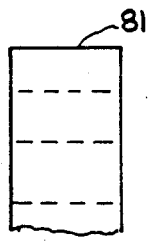
Figs. 3a through 3d and 4 show a sequenced forming of the stator core segments from strip lamination.
Figure 3A:
Figure 3C:
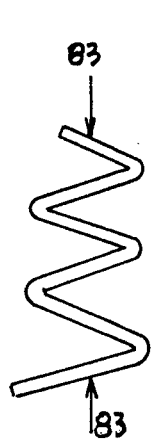
Figure 3D:
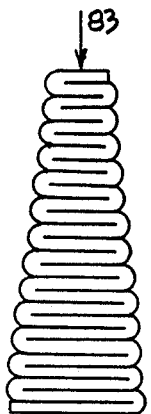
Figure 4:
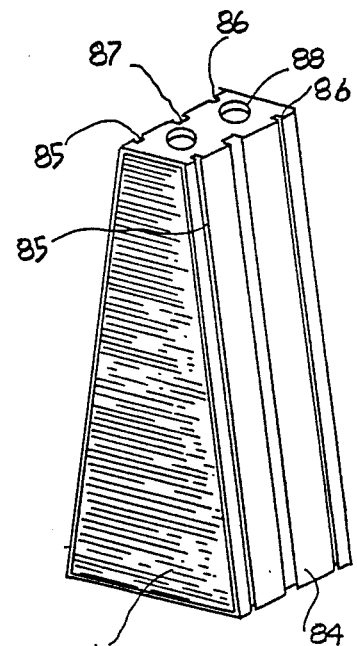

FIGS. 3 and 4 show forming of the stator core segments 1, accomplished in five steps. This technique is described in reference to core segments 1, but is applicable to other core segments as well. FIGS. 3a and 3b illustrate a cut-out of the lamination strip 81 for one stator core segment.

The strip 81 of constant width has transverse grooves 82 on opposite sides of the alternate steps. Before folding, the lamination strip 81 is rolled on side in sequence as shown in FIG. 3b. The zigzag lamination is then compressed (83) as in FIG. 3c. The thermoset sleeve 84 is then ironed on the perimeter of stator core segment 1, having two longitudinal grooves 85 and 86 on each side to accept slot wedges 5. The sleeve also includes longitudinal groove 87. The purpose of the groove 87 is to position the stator core segment in the non-magnetic stator plate 4. Openings 88 are from jaws while thermosetting the stator core segments. Ready-made stator core segments 1 are illustrated in a perspective view in FIG. 4.

Figure 5A:
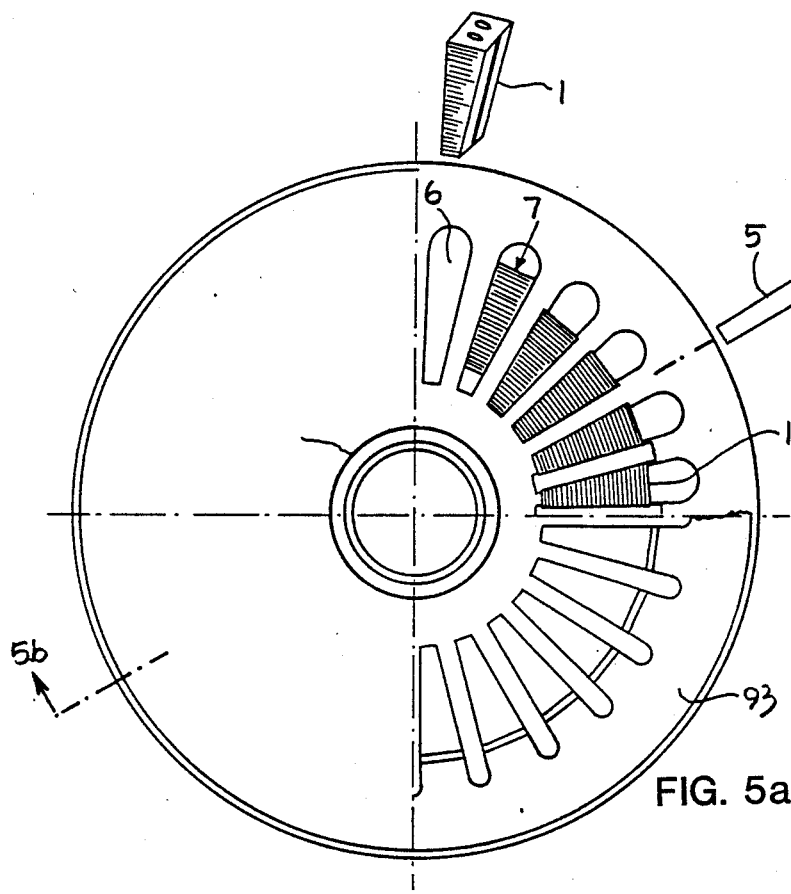
FIG. 5a is a front view of the stator.
Figure 5B:
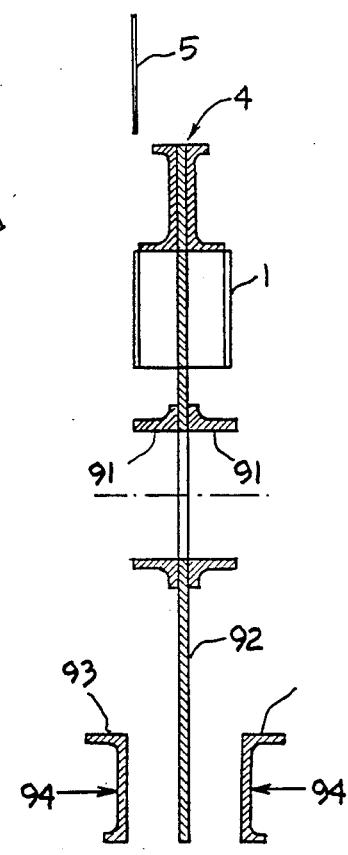
Figure 7:
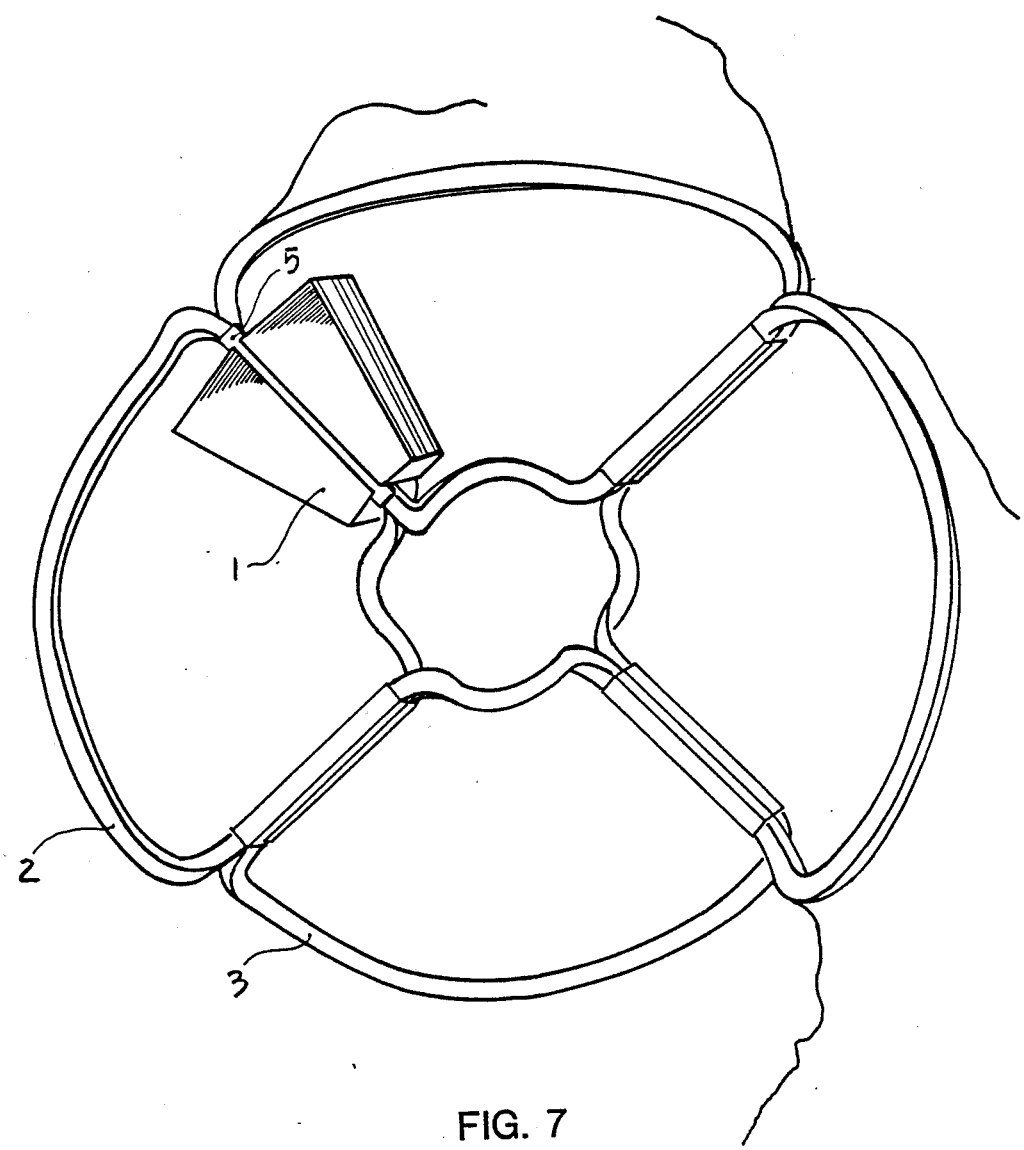

FIGS. 5a and 5b show details of the central stator assembly, without two sets of primary windings 2 and 3. The non-magnetic stator plate 4 has radially arranged trapezoid openings 6, disposed around the axis of the shaft. Openings 6 are sized so the ready-made stator core segments 1 can be inserted in a direction shown by arrow (7) and can wedge them in those openings along their longitudinal grooves 87. After all stator core segments 1 are in place, the ready-made windings 1 and 2 are laid in slots and locked by wedges 5 as shown in FIG. 7. The non-magnetic stator plate 4 is made of a hard material such as reinforced carborundum, having inner brims 91 and outer brims 93 to be kept securely in place, when the central stator assembly is mounted inside the end shields 56 and 57. In order to keep the stator core segments 1 in place, outer brims 93 are ironed (94) to the plate 92, after inserting the core segments 1 into openings 6.

Figure 8:
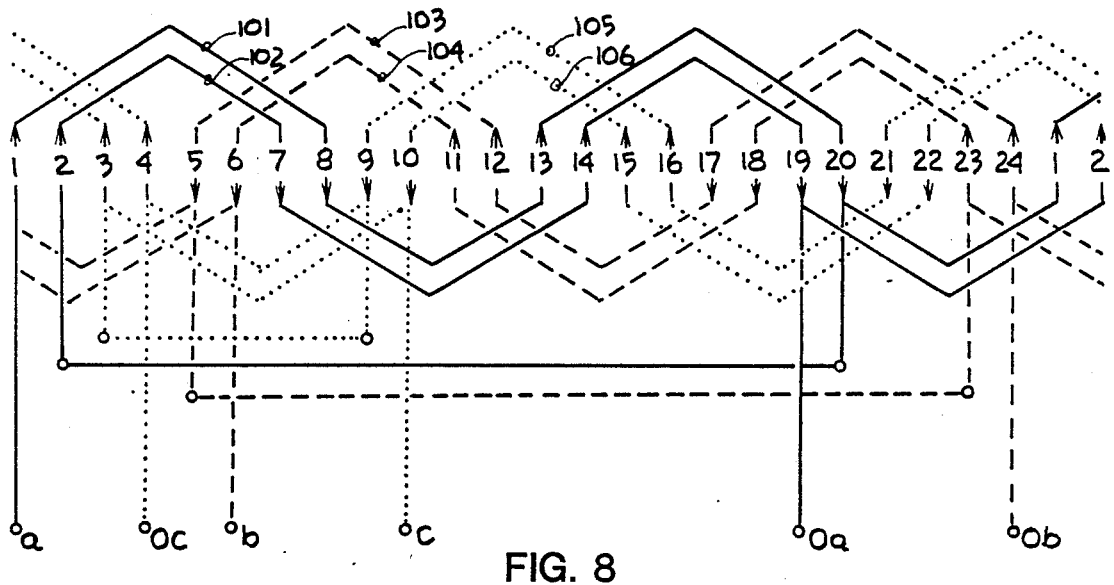
FIG. 8 is a layout diagram of a four-pole, three-phase, one-layer full pitch open wave form wire-type winding, employing coils as described in FIGS. 6a, 6b and 6c.
Figure 6A:
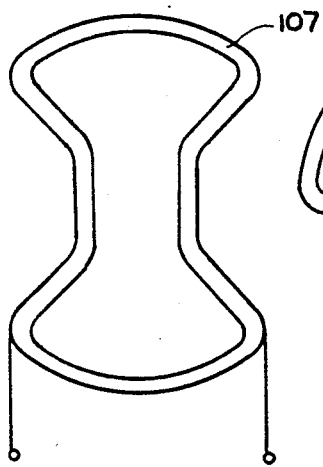
FIGS. 6a through 6c show the coil configuration of the primary winding for the embodiment of FIG. 1.

FIG. 8 shows a layout of a four-pole, three-phase, one layer, full pitch open wave form wire-type winding of q=2, with coils as defined in FIG. 6a (where q is a number of slots per pole, per phase). In case of a greater number of slots per pole per phase, n concentric coil sets can be utilized.

Figure 6B:
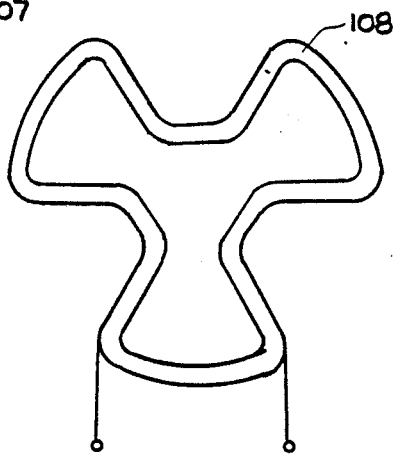
Figure 6C:
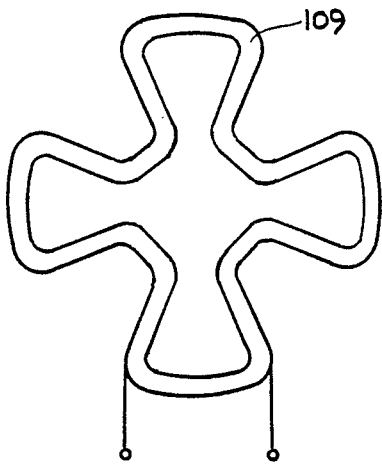

For a four-pole machine the lemniscate form coil 107 of FIG. 6a is employed either in the primary windings 2 and 3, or in the secondary windings 12 and 13. FIG. 6b illustrates a three-leaved rose form coil 108 of a six-pole machine, and FIG. 6c a four-leaved form coil 109 of an eight-pole machine.

Figure 9A:
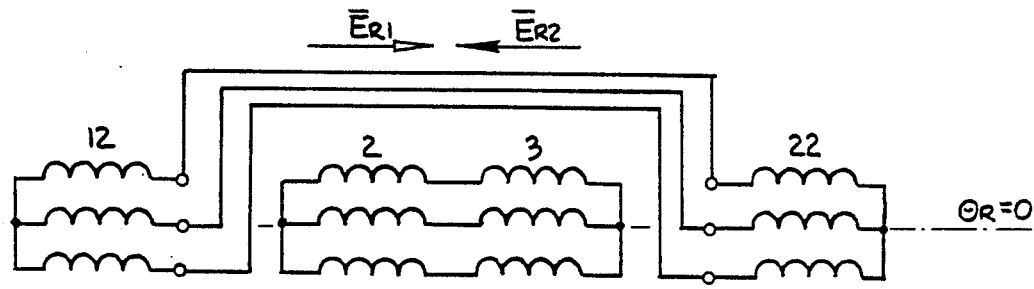
FIG. 9a is the circuit diagram and corresponding phasor diagram for a no-phase angle between two secondary windings.
Figure 9A:
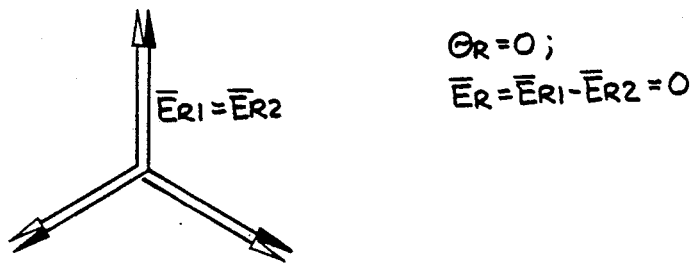
Figure 9B:
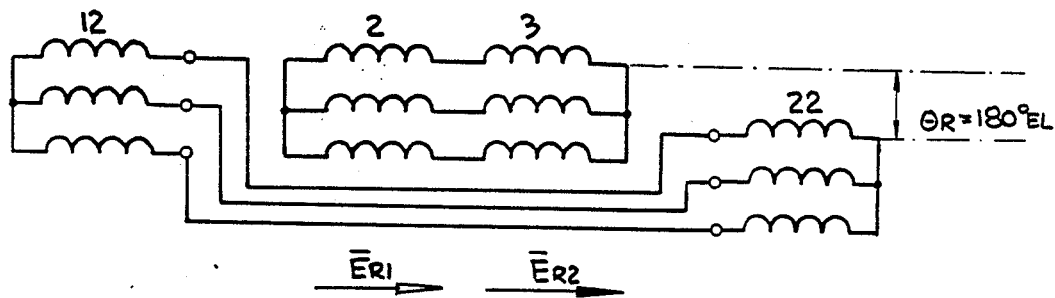
FIG. 9b is the circuit and phasor diagram for a full phase angle between these windings (FIG. 1).
Figure 9B:
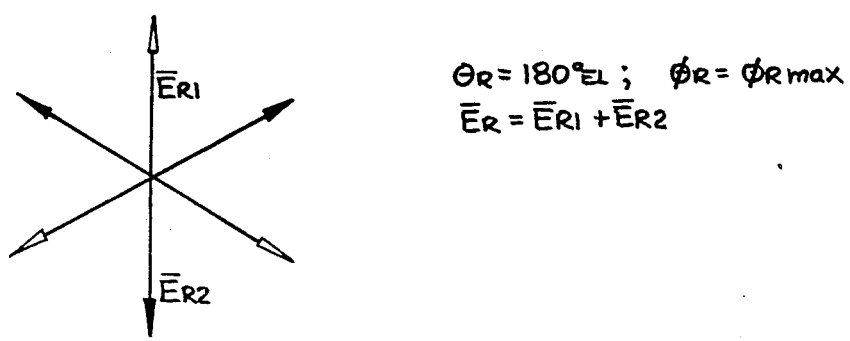

FIGS. 9a and 9b show phase shifting accomplished by positioning the secondary winding 22 of the right end rotor assembly according to FIG. 1. First, in FIG. 9a the winding 22 has the same position as the winding 12. On the phasor diagram the induced electromotive forces $E_{R1}$ and $E_{R2}$ of both secondary windings 12 and 22 are in phase and of the same amplitude. Therefore, their resultant EMF equals zero. When increasing the $O_R$, as it is obvious from the phasor diagram of FIG. 9b, the EMF $E_{R2}$ in winding 22 gradually rotates towards EMF $E_{R1}$ in winding 12, from zero to 180 electrical degrees. This yields an increasing resultant EMF $E_R$ with a maximum value of both of the EMF components.

Figure 10:
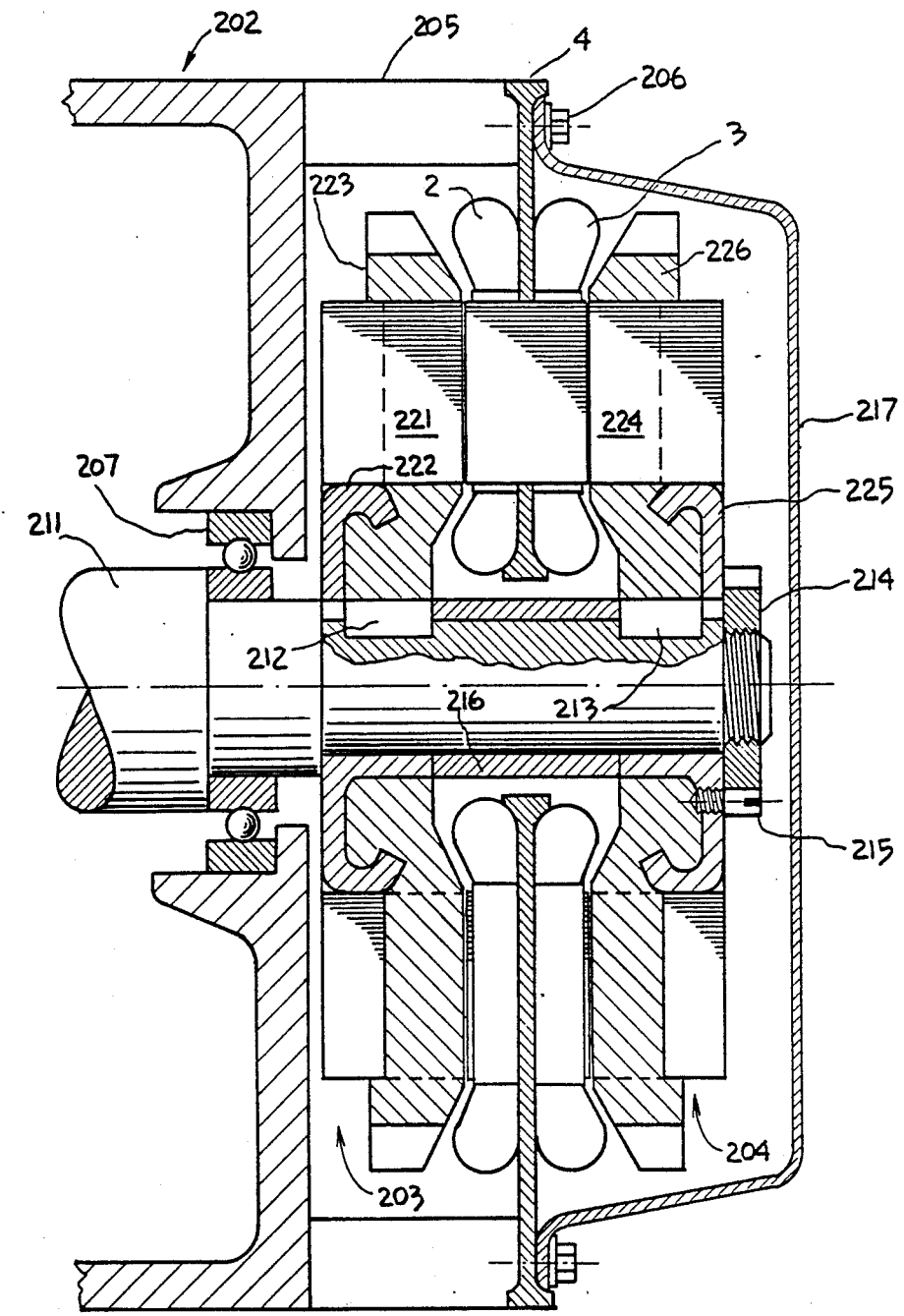
FIG. 10 is a cross-sectional view of the second embodiment of the subject invention including the central stator with no-shaft and no-end shield.
Figure 11:
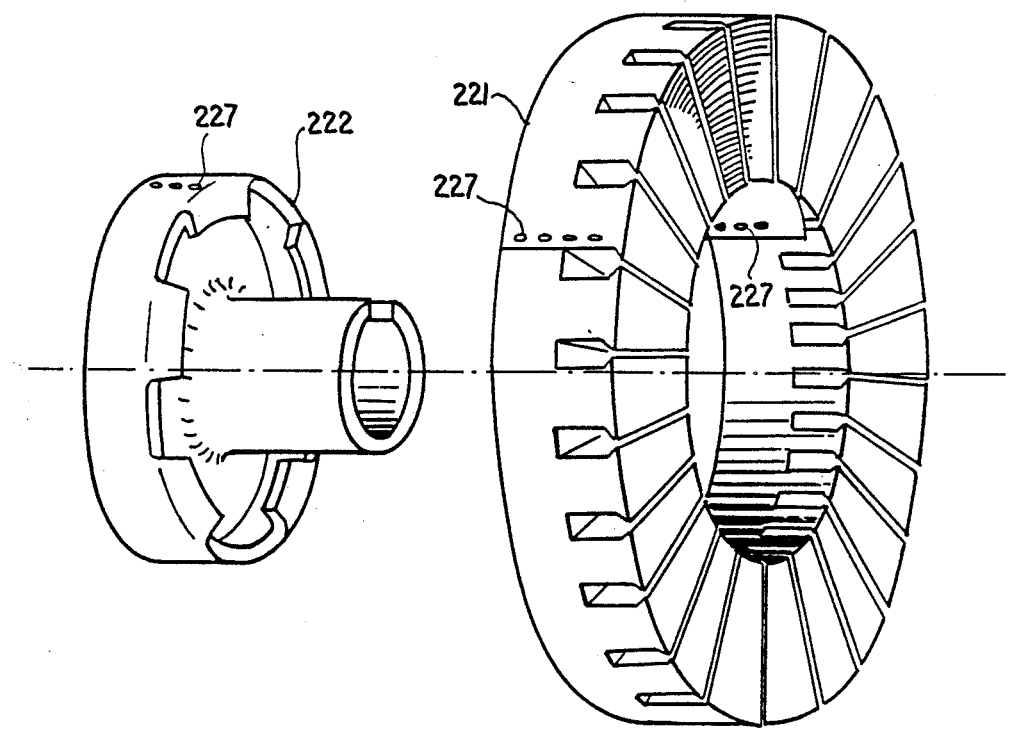
FIG. 11 is a perspective view of the rotor hub and core for the embodiment in FIG. 10.
Figure 12:
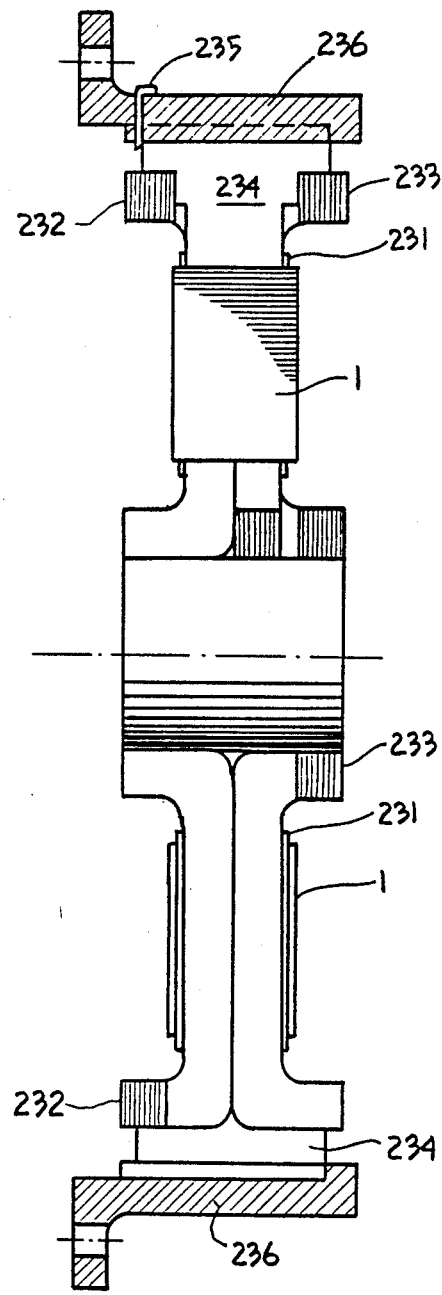
FIG. 12 is an alternative cross-sectional view of the primary winding and stator segments of the motor in FIG. 10.

FIGS. 10, 11 and 12 illustrate the second embodiment of the invention in the form of cage-type axial induction motor with the central stator and with no shaft or end shield. The central stator assembly is of the same construction as the embodiment of FIG. 1. Thus, like reference numbers denote like elements. The non-magnetic stator plate 4 is flange mounted to the housing 205 of a driven machine 202 by screws 206. The stator core segments 1 are constructed as previously described in reference to FIGS. 3 and 4. In the slots of the central stator assembly the primary windings 2 and 3 are laid from both sides interfacing the end rotors 203 and 204, and locked by wedges 5. The layout for windings 2 and 3 are shown in FIG. 8. The cage-type end rotors are of standard construction described in prior arts. The end rotor assembly 203 comprises the rotor core 221 wound on the hub 222, and the aluminum cage 223 casted in rotor slots. Similarly, the right end rotor is constructed. It includes the core 224, hub 225, and cage 226. The shaft 211 of the driven machine 202 protrudes through the circumferentially disposed ball bearing 207 of the housing 205 in the driven machine. Both end rotor assemblies are mounted on the shaft 211 of the machine, and are secured against rotating by keys 212 and 213. The spacing sleeve 216 keeps the rotors in an axial position, secured by nut 214 and screw 215.

FIG. 11 shows the left rotor hub 222 on which the one piece rotor core 221 is wound. Both ends of the lamination are fastened by welds 227. FIG. 12 illustrates details of the central stator assembly related to FIG. 10. The cross-sectional view shows the stator core segments 1 kept in position by lemniscate or n-leaved roses open wave form windings 232 and 233, wound of the rectangular flat conductors locked by slot wedges 231. The stator housing 236 encompasses the primary winding 232, self-contained within a plurality of axial insulator jaws 234, set on wider ends of stator core segments. The jaws firmly fit in dovetail guides of the housing 233, secured by wedges 235.

What is claimed is:
1. An axial air gap type induction machine comprising:
   a housing;
   a shaft rotatably mounted in said housing;
   a centrally located stator circumferentially surrounding said shaft and attached to said housing;
   a first end rotor disposed on one side of said stator and firmly mounted to said shaft;
   a second end rotor disposed on the other side of said stator and moveably mounted on said shaft, the movement of said second rotor being bidirectional about the circumference of said shaft, the move- ment of said second rotor causing phase shifting of both rotors, resulting in speed control of said induction machine; and shifting means for turnably positioning the second end rotor in respect to the first end rotor.

2. The axial induction machine of claim 1, wherein said stator comprises:
- a plurality of stator core segments made of a one piece zigzag folded steel lamination, laterally magneto-conductive, having opposed grooves extending longitudinally along opposite sides of said stator core segment;
- a non-magnetic stator plate with tapered radial slots, wherein said stator core segments are wedged in engagement with said grooves in a circular array about said stator plate;
- a lemniscate or n-leaved roses open wave form wire-type polyphase primary winding, laid in both end slots of stator core segments, wherein each successive primary winding is wound in opposite direction; and
- a plurality of slot wedges made of fiberglass material, inserted in longitudinal grooves of adjacent stator core segments positioned in said stator plate.

3. The axial induction machine of claim 1, wherein said first end rotor and second end rotor comprise:
- a plurality of magnetic rotor core lamination elements arranged in a subsequently opposite order of coat layers of an annulus to form a stator core of each said end rotor;
- an open star connected lemniscate or n-leaved roses open wave form wire-type polyphase secondary winding, laid in said slots of said rotor core lamination elements, wherein each successive secondary winding of said first and second end rotors is wound in opposite direction to achieve induced electromotive forces of the same phase sequence;
- a rotor rear plate, wherein said rotor core lamination elements are stacked in radial dovetail guides, being supported by an axially extending inner rim with a bore to receive the rotor shaft therethrough;
- means for compressing the rotor care lamination elements in an annular form, including an outer rotor clamp surrounding a plurality of rotor core fingers; and
- a rotor hub, wherein said rotor rear plate is mounted.

4. The axial induction machine according to claim (10) 3, wherein said rotor hub of the first end rotor or said second end rotor has moveably conductive interconnection comprising:
- a plurality of mutually isolated brushes connected to open ends of the star connected polyphase secondary winding of said first end rotor; and
- a plurality of mutually isolated conductive slider segments connected to open ends of the star connected polyphase secondary winding of said second end rotor.

5. the axial induction machine of claim 1, wherein said shifting means comprise:
- a servomotor concentrically mounted to said rotor rear plate of said second end rotor;
- an internally threaded cylinder mounted into hollow rotor of said servomotor; and
- a sleeve-like slider inside said threaded cylinder having peripheral threads and internal skewed grooves matching the skewed grooves defined on said shaft.

6. An axial induction machine complete with an unspecified driven machine having a housing, said induction machine comprising:
- a central stator, flange mounted to the housing of the driven machine; and
- a pair of end rotors disposed on each side of said central stator and firmly mounted to the extended shaft end of the driven machine.

7. The axial induction machine of claim 6, wherein said central stator comprises:
- a stator housing;
- a non-magnetic stator plate according to claim 2;
- a plurality of laterally magnetoconductive stator core segments, made of a one piece zigzag folded steel lamination having longitudinal grooves according to claim 2;
- an impregnated lemniscate or n-leaved roses open wave form polyphase primary winding wound of rectangular flat conductors laid into slots of the stator core segments; and
- a plurality of radial insulator jaws set on wider ends of stator core segments and firmly fitted into dovetail guides of said stator housing.

* * * * *